(12) United States Patent  (10) Patent No.: US 9,765,646 B2
Lipka  (45) Date of Patent: Sep. 19, 2017

(54) WIND TURBINE ROTOR BLADE FOR A ROTOR WITH A SPINNER

(71) Applicant: Nordex Energy GmbH, Hamburg (DE)

(72) Inventor: Thomas Lipka, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 348 days.

(21) Appl. No.: 14/477,204

(22) Filed: Sep. 4, 2014

(65) Prior Publication Data

US 2015/0147187 A1  May 28, 2015

(30) Foreign Application Priority Data

Nov. 27, 2013 (EP) .................................... 13194734

(51) Int. Cl.
| | |
|---|---|
| *F01D 25/24* | (2006.01) |
| *F03D 1/06* | (2006.01) |
| *F03D 80/00* | (2016.01) |
| *B23Q 3/00* | (2006.01) |
| *F03D 13/10* | (2016.01) |

(52) U.S. Cl.
CPC .............. *F01D 25/24* (2013.01); *B23Q 3/00* (2013.01); *F03D 1/0658* (2013.01); *F03D 1/0675* (2013.01); *F03D 13/10* (2016.05); *F03D 80/00* (2016.05); *F05B 2240/57* (2013.01); *F05B 2260/301* (2013.01); *Y02E 10/721* (2013.01); *Y10T 29/49321* (2015.01); *Y10T 29/53961* (2015.01)

(58) Field of Classification Search
CPC ........ F01D 25/24; F03D 80/00; F03D 1/0675; Y02E 10/721; Y10T 29/53961; Y10T 29/49321; F05B 2240/57
See application file for complete search history.

(56) References Cited

U.S. PATENT DOCUMENTS

| | | | |
|---|---|---|---|
| 7,745,951 B2 | 6/2010 | Numajiri et al. | |
| 8,585,948 B2 | 11/2013 | Flach et al. | |
| 9,132,590 B2 | 9/2015 | Frydendal et al. | |

(Continued)

FOREIGN PATENT DOCUMENTS

| | | |
|---|---|---|
| CN | 201326508 Y | 10/2009 |
| CN | 201714586 U | 1/2011 |

(Continued)

*Primary Examiner* — John C Hong
(74) *Attorney, Agent, or Firm* — Walter Ottesen, P.A.

(57) ABSTRACT

A wind turbine rotor blade is for mounting on a rotor hub covered by a spinner having a rotor blade opening and includes a wind turbine rotor blade body having a fastening section and a longitudinal section. The fastening section is configured for fastening the rotor blade body on the rotor hub. The longitudinal section is arranged inside the rotor blade opening when the wind turbine rotor blade is mounted on the rotor hub. The longitudinal section and the rotor blade opening conjointly define an annular gap therebetween when the wind turbine rotor blade is mounted on the rotor hub. A cover profile is fastened on the wind turbine rotor blade and covers the annular gap. The cover profile has a circular ring-shaped outer edge and a circular ring-shaped inner edge. The inner edge is disposed at a radial distance from the wind turbine rotor blade. An annular-shaped cover element is fastened on the wind turbine rotor blade and bridges the radial distance.

13 Claims, 4 Drawing Sheets

(56) References Cited

U.S. PATENT DOCUMENTS

2010/0135607 A1    6/2010  Rogall et al.
2014/0341742 A1*  11/2014  Knoop .................. B66C 1/108
                                                                         416/215
2016/0290313 A1   10/2016  Zwart

FOREIGN PATENT DOCUMENTS

| CN | 201739095 U | 2/2011 |
| CN | 202326034 U | 7/2012 |
| CN | 202338443 U | 7/2012 |
| CN | 202493385 U | 10/2012 |
| CN | 202883268 U | 4/2013 |
| WO | 2011/012664 A2 | 2/2011 |
| WO | 2011/012683 A2 | 2/2011 |

* cited by examiner

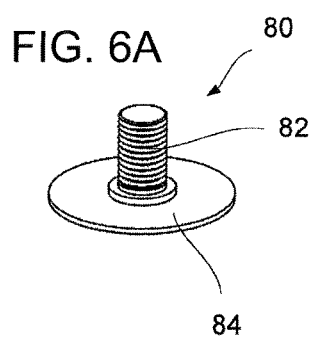
FIG. 6A
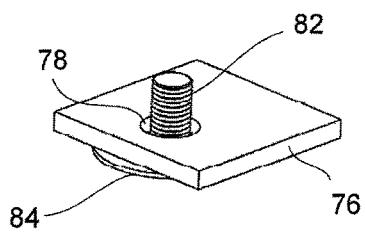
FIG. 6B
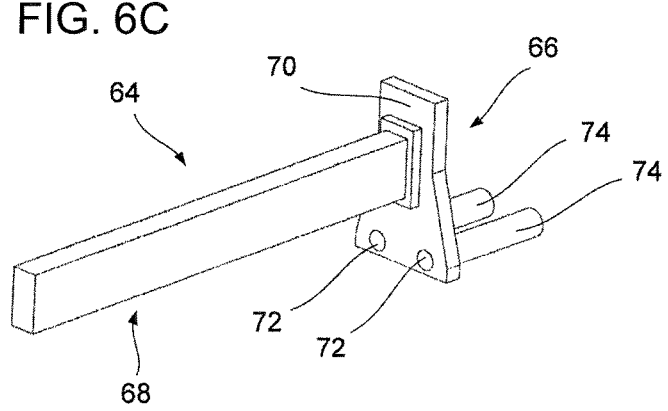
FIG. 6C
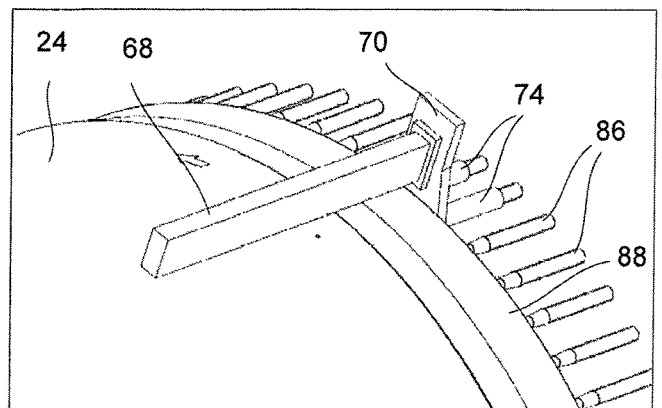
FIG. 6D
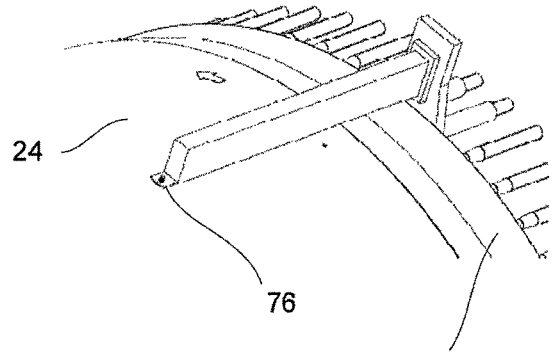
FIG. 6E
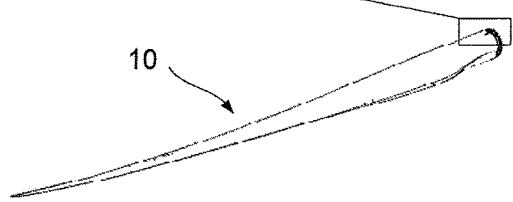

WIND TURBINE ROTOR BLADE FOR A ROTOR WITH A SPINNER

CROSS REFERENCE TO RELATED APPLICATION

This application claims priority of European patent application no. 13194734.3, filed Nov. 27, 2013, the entire content of which is incorporated herein by reference.

FIELD OF THE INVENTION

The invention relates to a wind turbine rotor blade for mounting on a rotor hub which is covered by a spinner having a rotor blade opening.

BACKGROUND OF THE INVENTION

The rotor hubs of wind turbines generally have special cutouts which are suitable for access of components or tools in order to transport these into the hub or nacelle or to exchange them. The rotor hub can be covered by a spinner in order to protect the rotor hub against environmental influences. A spinner is a housing which completely or partially encloses the rotor hub. The spinner improves the aerodynamic characteristics of the rotor and contributes to an aesthetic appearance of the wind turbine. A spinner furthermore offers the advantage that work can be carried out in its interior at considerable height even in poor weather.

For each rotor blade, the spinner has a rotor blade opening into which the rotor blade can be inserted during installation. Located between spinner and rotor blade is an annular gap which requires special sealing in order to protect the interior of the spinner against environmental influences. Otherwise, water running down on the rotor blade could, in particular, penetrate the interior of the spinner unhindered and damage the elements of the rotor hub which are located therein and are generally not specifically protected against environmental influences.

The mounting of the rotor blade on the rotor hub is usually carried out at considerable height and not always in calm conditions. In order to be able to guide the rotor blade through the rotor blade opening in the spinner onto the rotor hub in a secure and damage-free manner, however, the annular gap has to have a considerable width of, for example, approximately 160 mm. During subsequent operation of the wind turbine, moreover, a relative movement takes place between the rotor blade and the rotor blade opening in the spinner during adjustment of the blade pitch angle, which has to be taken into account in the sealing of the annular gap.

A cover profile for covering the annular gap is disclosed in printed publication CN 201739095 U. It has a central, conical section and two short circular-cylindrical sections adjoining it.

The cover profile disclosed in printed publication CN 201326508 Y has a cross section which is exactly the same but is divided into two semicircular segments.

A further cover profile, which is divided into two semicircular segments, is disclosed in printed publication CN 202326034 U. In an exemplary embodiment, the segments are mounted in a manner in which they overlap each other.

The two printed publications WO 2011/012664 A2 and WO 2011/012683 A2 show a cover of the annular gap with two adjacently arranged cover rings. One of the cover rings is fastened on a spinner-like housing and the other is fastened on the rotor blade.

A wind turbine, in which two cover profiles interact to cover the annular gap, is disclosed in U.S. Pat. No. 7,745,951. A first cover profile is ring-shaped and fastened on the rotor blade. It has a conical section, beginning at the rotor blade, and a circular-cylindrical section adjoining it. The free end of the circular-cylindrical section engages in a type of annular groove which is formed on a second ring-shaped cover profile which is fastened at the rotor opening of the spinner. As a result, the penetration of water into the annular gap is to be prevented regardless of whether the water flows from the hub or from the rotor blade towards the annular gap.

Specific difficulties can occur during installation of the cover profiles. The surface of the rotor blade may possibly have irregularities so that gaps, which have to be sealed, occur between the cover profile and the rotor blade surface. This is usually carried out with a highly viscous sealing compound, which can only be used in a dry environment. Considerable problems occur if the rotor blade in the region of the rotor blade opening of the spinner is no longer circular-cylindrical but already merges into an aerodynamic profile of the rotor blade. If conventional cover profiles are installed on such a rotor blade, they deform so that their outer circumference is similarly no longer circular, as a result of which an optimum covering of the circular rotor blade opening of the spinner is no longer ensured.

SUMMARY OF THE INVENTION

It is an object of the invention to provide a wind turbine rotor blade with a cover profile for covering an annular gap which is simple to produce and to install and ensures an adequate covering of the annular gap, and also to provide a method for producing such a wind turbine rotor blade and a positioning tool for installing the cover profile.

The wind turbine rotor blade is intended for mounting on a rotor hub which is covered by a spinner which has a rotor blade opening. The wind turbine rotor blade has a fastening section for fastening the wind turbine rotor blade on the rotor hub and a longitudinal section which is to be arranged inside the rotor blade opening. For covering an annular gap between the longitudinal section and the rotor blade opening, a cover profile, which has a circular ring-shaped outer edge, is fastened on the wind turbine rotor blade, wherein
  the cover profile has a circular ring-shaped inner edge which has a radial distance from the wind turbine rotor blade, and
  a ring-shaped cover element which is fastened on the wind turbine rotor blade and which bridges the radial distance.

If terms such as "axial", "radial", "longitudinal direction", "circumferential direction" or similar direction descriptions are used in the following text, these always refer to the blade connection of the rotor blade to its essentially circular-cylindrical fastening section. The longitudinal direction extends from the center point of the fastening section in the vertical direction to the plane of the fastening section. The radial direction is perpendicular to this longitudinal direction and the axial direction is parallel thereto.

The wind turbine rotor blade can be configured for a wind turbine with an essentially horizontal rotor axis, especially for operation with variable blade pitch angle. The fastening section is located on the blade root and can have a flange. The fastening section can be screwed to the rotor hub via a multiplicity of bolts. To this end, the fastening section can have holes for accommodating the bolts. The fastening of the fastening section on the rotor hub can be carried out on a bearing ring of a pitch bearing so that the blade pitch angle can be adjusted via a pitch drive which is suitable for it.

The rotor blade opening is located in the spinner. The spinner can have a plurality of rotor blade openings corresponding to the number of rotor blades. Each rotor blade opening is circular. The longitudinal section of the rotor blade which is to be arranged inside the rotor blade opening is located in the longitudinal direction of the rotor blade at a distance from the fastening section so that the fastening section and therefore the connection between rotor blade and rotor hub is arranged inside the spinner. In the region of the longitudinal section, the cross section of the wind turbine rotor blade differs by a greater or lesser degree from the circular cross section of the fastening section.

The cover profile has a circular ring-shaped outer edge which is matched to the rotor blade opening so that the annular gap between rotor blade opening and wind turbine rotor blade is covered in the provided manner. The cover profile also has a circular ring-shaped inner edge. The cover profile can, in particular, be completely rotationally symmetrical, which simplifies its production. The cover profile can be produced from plastic, in particular fiber-reinforced plastic, or from metal materials such as aluminum.

The circular ring-shaped inner edge has a radial distance from the wind turbine rotor blade. This distance enables the cover profile to be fastened on the wind turbine rotor blade in the provided manner, even if the cross section of the wind turbine rotor blade in the region of the cover profile deviates from a perfect circular shape. Such deviations can occur, for example, as a result of manufacturing tolerances or in the case of additional reinforcements on the outer side of the wind turbine rotor blade. The radial distance can be formed over the entire circumference of the inner edge or only in one or more sections thereof. It can have a value there of, for example, 2 mm or more, 5 mm or more, or 10 mm or more. The diameter of the inner edge can be larger than a largest diameter of the wind turbine rotor blade in the region of the inner edge, especially by 2 mm or more, by 5 mm or more, or by 10 mm or more. The radial distance is bridged by a ring-shaped cover element which is also fastened on the wind turbine rotor blade.

The annular gap between the rotor blade opening of the spinner and the wind turbine rotor blade is completely covered by the cover profile and the cover element. The cover profile and the cover element are both fastened indirectly or directly on the wind turbine rotor blade so that during adjustment of the blade pitch angle they rotate together with the wind turbine rotor blade around its longitudinal axis.

In an embodiment, the radial distance varies in the circumferential direction. This is especially the case if the longitudinal section of the rotor blade already merges into an aerodynamic profile and therefore does not have an exactly circular cross section. In this case, the annular gap between rotor blade opening and longitudinal section also has a varying width. The distance between the inner edge of the cover profile and the wind turbine rotor blade is bridged at each circumferential position by the cover element.

The cover element, in the same way as the cover profile, can be of single-piece or multi-piece configuration. The cover element can, in particular, be located on the side of the cover profile facing away from the fastening section. The radial extent of the cover element can be selected so that the permissible transporting dimensions of the rotor blade are not exceeded, for example by the outside diameter of the cover element being configured to be no greater than 4.20 m. The cover element can be made of an elastic material and can be configured in the form of a rubber lip, for example. The cover profile can be divided into two or more segments in the circumferential direction. The segments can be interconnected. An elongated hole can be formed at one end or at both ends of the cover profile or of a segment of the cover profile and during installation of the cover profile around the wind turbine rotor blade enables an accurate adaptation of the cover profile to the circumference of the wind turbine rotor blade. Two ends of the cover profile, or of corresponding segments of the cover profile, which are interconnected via elongated holes, can, in particular, be interconnected with the aid of a bracket.

The invention enables a simple and accurate fitting covering of the annular gap between rotor blade opening in the spinner and rotor blade, especially in the case of such rotor blades of which the longitudinal section, arranged in the rotor blade opening, is not circular in cross section. In particular, the cover profile and its outer, circular edge maintain the desired geometry with respect to the rotor blade opening. In this case, the cover profile can even be fitted independently of the precise shape of the longitudinal section of the rotor blade because tolerances can be compensated via the cover element. This also especially applies when for a specific type of wind turbine different rotor blade variants are to be used, for example for light wind and strong wind regions.

In an embodiment, the cover profile has a retaining section which extends from the inner edge in the direction towards the fastening section of the rotor blade. The retaining section can extend essentially in the axial direction. It can be formed as an encompassing, circular-cylindrical flange. Alternatively, the retaining section can be divided into a plurality of sections or have a multiplicity of individual brackets. The retaining section is always located on an inner side, that is, on a side of the cover profile facing the interior of the spinner. The fastening of the cover profile via the retaining section can therefore be carried out from the inner side and the fastening means which are used and also the retaining section itself are protected against environmental influences by the cover profile.

In an embodiment, the cover profile is installed on the wind turbine rotor blade by a multiplicity of adjustable fastening elements which are adapted to the radial distance between cover profile and wind turbine rotor blade. The fastening elements can be connected in an optional manner to the wind turbine rotor blade and to the cover profile, for example via adhesive fastening or screwing. By adapting the fastening elements to the possibly varying radial distance, the fastening elements hold the cover profile in the desired arrangement and act in the same manner as spacers.

In an embodiment, the fastening elements each have a threaded pin and an adjustable stop. The threaded pin can be fastened on the wind turbine rotor blade and be arranged in a radial direction with respect to the wind turbine rotor blade. The threaded pin can be screwed into a threaded bushing in the rotor blade or adhesively fastened to the rotor blade, for example. For adapting the fastening element to the varying radial distance, a stop, for example a nut, can be brought into the desired position by rotation relative to the threaded pin. In this way, a particularly simple adaptation of the fastening element to the respectively existing radial distance is possible, wherein all the necessary fastening elements can be of identical design.

In an embodiment, the cover element butts against the cover profile. As a result, the interface between cover element and cover profile is formed in a simple manner with sealing effect. The cover profile can, in particular, have a conical section, against which butts an edge of the cover element. The cover element can also have a conical section which can butt against the conical section of the cover profile not only by an edge but with flat contact. Additional sealing of the interface between cover element and cover profile, which has to be produced at high cost and possibly has to be routinely maintained, can be dispensed with.

The aforementioned object is also achieved by a method for producing a wind turbine rotor blade which includes the following steps:

providing a wind turbine rotor blade which is intended for mounting on a rotor hub which is covered by a spinner having a rotor blade opening, and which has a fastening section for fastening the wind turbine rotor blade on the rotor hub and a longitudinal section which is to be arranged inside the rotor blade opening, providing a cover profile for covering an annular gap between the longitudinal section and the rotor blade opening, wherein the cover profile has a circular outer edge and a circular inner edge, arranging and fastening the cover profile on the wind turbine rotor blade in such a manner that the inner edge has a radial distance from the wind turbine rotor blade, and arranging and fastening a cover element on the wind turbine rotor blade in such a manner that the cover element bridges the radial distance.

It is understood that the method steps can basically be carried out in any sequence. For the features and advantages of the method, reference is made to the previous descriptions of the wind turbine rotor blade which can be produced using the method, which correspondingly apply.

The method makes the production of the wind turbine rotor blade easier especially by the fact that the combination of cover profile and cover element is suitable for bridging tolerances in the surface of the wind turbine rotor blade during installation. Furthermore, the cover profile does not have to be adapted to the respective profile of the rotor blade in the longitudinal section. The bridging of the gap which remains between cover profile and wind turbine rotor blade via the cover element is achieved in a particularly simple manner if the cover element is flexible. So, for example, either the cover profile can be inserted into the cover element for installation, or the cover element is simply folded over after installation of the cover profile. The cover element can then tightly butt flat against the cover profile. Alternatively, the cover element could also be constructed with a rectangular cross section from flexible material so that during installation of the cover profile it is compressed in the gap in such a manner that this is tightly sealed.

In an embodiment, the method includes the following additional steps:

fastening a multiplicity of fastening elements, which have adjustable spacers, on the wind turbine rotor blade, adapting the spacers to the radial distance between cover profile and wind turbine rotor blade.

As a result of these additional steps, which can also be carried out in any sequence, the installation of the cover profile in the desired arrangement is further simplified, especially if the fastening elements have already been adapted to the radial distance via the spacers before the fastening of the cover profile. Regardless of the sequence of the implementation of the individual steps, the spacers, adjusted to the correct dimension, ensure a secure retention of the cover profile in the desired arrangement.

The spacers can also be adapted to a varying radial distance, for example if the wind turbine rotor blade in the longitudinal section already merges into an aerodynamic profile.

In an embodiment, a positioning tool is oriented and/or fastened on the fastening section on the wind turbine rotor blade. Through the positioning tool, the arranging and fastening of the fastening elements and/or spacers in the desired position is made significantly simpler. It is also possible to use the positioning tool for arranging the cover element in the intended position.

In an embodiment, via the positioning tool one of the fastening elements is positioned on the wind turbine rotor blade and/or one of the spacers is adapted to the radial distance between cover profile and wind turbine rotor blade. The positioning tool directly or indirectly predetermines the installed position of the fastening elements and/or of the spacers. The spacers can, in particular, be configured as adjustable stops, but the distance can also be bridged in another way, for example by an adhesive coating.

In an embodiment, the fastening element is inserted into a socket of the positioning tool after installation of the positioning tool on the fastening section. This makes it possible to accurately guide the fastening element onto the wind turbine rotor blade in the intended position. In particular, it can be inserted in the radial direction into a socket of the positioning tool and guided onto a surface of the wind turbine rotor blade, and adhesively fastened thereto. In this manner, an accurate arrangement of the cover profile is achieved in a particularly simple manner.

In an embodiment, the cover element is fastened on the wind turbine rotor blade before transporting the wind turbine rotor blade to the erection site of the wind turbine, and the cover profile is fastened thereafter. The mentioned fastening elements and spacers for the cover profile can also already be installed before the transporting of the wind turbine rotor blade. It is then particularly simple to install the cover profile at the erection side of the wind turbine in the desired arrangement and, where applicable, only after fastening of the wind turbine rotor blade on the rotor hub because the correct arrangement of the cover profile is made significantly simpler as a result of the pre-installed cover element, against which the cover profile can butt, and/or as a result of the fastening elements or spacers which are pre-installed in the correct position. In a preferable embodiment, only a wrench, one person and no measuring tool at all are required. As a result of the simple sealing with the cover element, there is no requirement either for conventional sealing with a highly-viscous liquid sealing compound, therefore all operations can be carried out even in damp or rainy weather. At the same time, transporting of the wind turbine rotor blade with the cover profile already installed is not necessary so that the dimensions of the wind turbine rotor blade which is to be transported are not significantly increased.

The above mentioned object is also achieved by a positioning tool. The positioning tool serves for the installation of a fastening element for fastening a cover profile on a wind turbine rotor blade, especially with a method as described above. The wind turbine rotor blade has a fastening section for fastening on a rotor hub and the positioning tool includes the following:

a holding device which is configured for installation on the fastening section in a predetermined position relative to the fastening section, and a positioning device for the positioning of the fastening element in a predetermined arrangement relative to the wind turbine rotor blade and/or for adapting a spacer of a fastening element to a radial distance between the cover profile and the wind turbine rotor blade.

For the features and advantages of the positioning tool, reference is made to the previous descriptions of the wind turbine rotor blade and of the method for its production, which correspondingly apply.

The positioning tool simplifies the arranging of the fastening element and/or the adapting of the spacer in the intended installed position and to this end has a holding device and a positioning device. The holding device is configured for fastening on the fastening section of the rotor blade so that the positioning tool can be fastened in a simple manner in a predetermined position relative to the rotor blade. The positioning device simplifies the positioning of the fastening element and/or spacer by it interacting with the fastening element or with the spacer in a suitable manner, especially with the aid of a stop, a mark or a socket.

After the corresponding positioning of the fastening element on the positioning device, the fastening element is automatically located in the intended installed position relative to the wind turbine rotor blade. Extensive and/or time-consuming measuring steps or adjustment steps are not necessary for this.

In an embodiment, the holding device has at least one hole which can be positioned over a fastening bolt which is anchored in the fastening section. The holding device can be in the form of a plate, for example, with two such holes so that it can be fixed in a simple manner on the fastening section in an accurately predetermined position. In the case of a circular-cylindrical fastening section, this is possible in different "rotational positions" so that the positioning device can be used at a plurality of positions. After being installed on the fastening section, the holding device is always located at an accurately predetermined longitudinal position and at an accurately predetermined distance from a longitudinal axis of the wind turbine rotor blade.

In an embodiment, the positioning device has an adapter with a socket for the fastening element. The adapter can also be configured such that it can accommodate a fastening element with a spacer pre-installed thereupon. The adapter can be detachably fastened on the positioning device, especially with a holding device fastened on the fastening section. In particular, the fastening element, which is retained in the socket, and/or the adapter can be guided onto the wind turbine rotor blade in the radial direction. In principle, the fastening element can also be inserted directly into a corresponding opening of the positioning device. The use of an adapter can simplify the arranging of the fastening element, however. At the same time, the positioning tool can be removed from the wind turbine rotor blade in a particularly simple manner after the fastening element has been fastened on the wind turbine rotor blade. To this end, the adapter can initially remain on the fastening element, while the positioning device is separated from the adapter. After the removal of the positioning device from the wind turbine rotor blade, the adapter can then be released from the fastening element.

In an embodiment, the arrangement of the positioning device relative to the holding device is adjustable. For example, the positioning device can be adjusted in the radial and/or axial direction relative to the holding device and fixed in a desired arrangement, for example via adjusting screws and/or setscrews and/or a guide. In this way, the positioning tool can for the most part be used universally, wherein the resulting installed position of the cover profile can be adapted for example to different sizes of rotor blade openings (via radial adjustment) and/or to different distances of the longitudinal section—which is to be arranged in the rotor blade opening—from the fastening section (via axial adjustment).

BRIEF DESCRIPTION OF THE DRAWINGS

The invention will now be described with reference to the drawings wherein:

FIGS. 6A to 6E show different method steps when the positioning tool of FIG. 5 is in use.

DESCRIPTION OF THE PREFERRED EMBODIMENTS OF THE INVENTION

Figure 1:
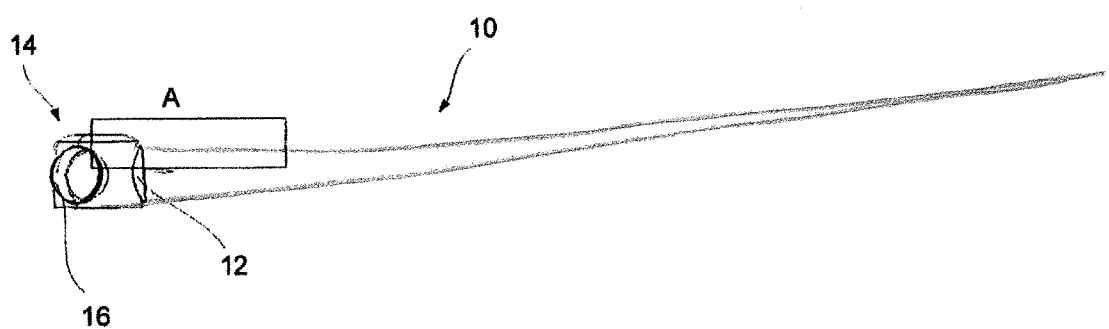
FIG. 1 shows a wind turbine rotor blade according to the invention which is mounted on a hub with a spinner.

FIG. 1 shows a wind turbine rotor blade 10 which is fastened on a rotor hub 12. The rotor hub 12 is intended for the mounting of two further wind turbine rotor blades 10, that is, for a three-bladed rotor. The rotor hub 12 is covered by a spinner 14 which has a rotor blade opening 16 for each wind turbine rotor blade 10. The rotor blade openings 16 are circular.

When the wind turbine rotor blade 10 is mounted on the rotor hub 12, the wind turbine rotor blade 10, with a fastening section 88 (see FIGS. 6D and 6E)—not shown in FIG. 1—is guided through the rotor blade opening 16 and fastened on the rotor hub 12. The fastening is especially carried out on a rotatably mounted bearing ring of a pitch bearing—not shown—in order to enable an adjustment of the blade pitch angle of the wind turbine rotor blade 10.

Figure 2:
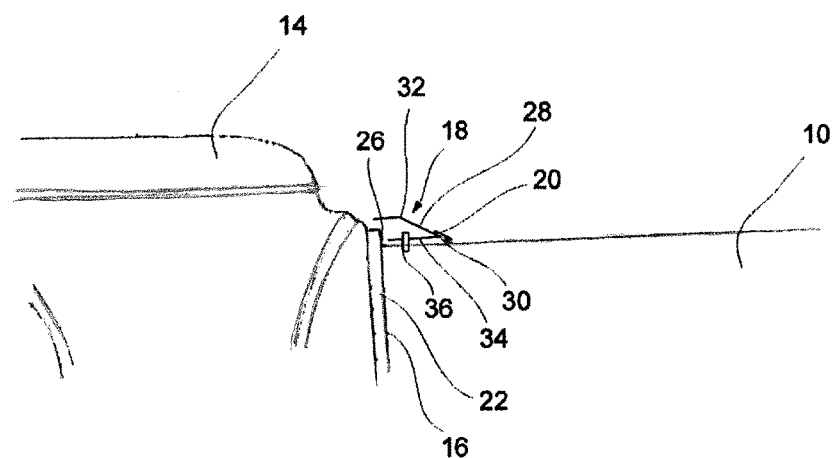
FIG. 2 is an enlarged view of the detail designated "A" in FIG. 1.

FIG. 2 shows the detail which is identified by "A" in FIG. 1. In addition to the elements which are described in conjunction with FIG. 1, a cover profile 18 and a cover element 20 are shown schematically in FIG. 1. It is apparent in FIG. 2 that the spinner 14 has a circular-cylindrical section 22 which forms the rotor blade opening 16 and encompasses the wind turbine rotor blade 10. A longitudinal section 24 (see FIGS. 6D and 6E) of the wind turbine rotor blade 10 is arranged inside the rotor blade opening 16. Formed between the rotor blade opening 16 and the longitudinal section 24 of the wind turbine rotor blade is an annular gap 26 which, for example, has a width of between 100 and 200 mm. The fastening section 88 of the wind turbine rotor blade 10 is located inside the spinner 14 and is not shown in FIG. 2.

The cover profile 18 and the cover element 20 jointly cover the annular gap 26. To this end, the cover profile 18 has a conical section 28, an inner edge 30 and an outer edge 32. The inner edge 30 and the outer edge 32 are each circular. Adjoining the inner edge 30 of the conical section 28 is a retaining section 34 of circular-cylindrical configuration which points towards the fastening section. It is arranged at a distance from the surface of the wind turbine rotor blade 10 and is fastened on the wind turbine rotor blade 10 by a fastening element 36 which bridges this distance.

Since the wind turbine rotor blade 10 is not completely circular-cylindrical in the region of the rotor blade opening 16 but already merges into the aerodynamic profile of the wind turbine rotor blade 10, the radial distance between the wind turbine rotor blade 10 and the circular inner edge 30 of the cover profile 18 varies in the circumferential direction.

The cover element 20 is of conical configuration and is fastened by its inner edge on the wind turbine rotor blade 10. It extends annularly around the wind turbine rotor blade 10 and is located on the side of the cover profile 18 which faces away from the fastening section 88. It is made of a flexible material, for example rubber, and butts flat against the conical section 28 of the cover profile 18 so that, in particular, a penetration of water running down on the wind turbine rotor blade 10 into the gap between cover profile 18 and wind turbine rotor blade 10 is prevented.

The fastening element 36 is accessible from the inner side of the spinner 14 and is itself covered by the cover profile 18 and cover element 20 and therefore protected against weather influences.

Figure 3:
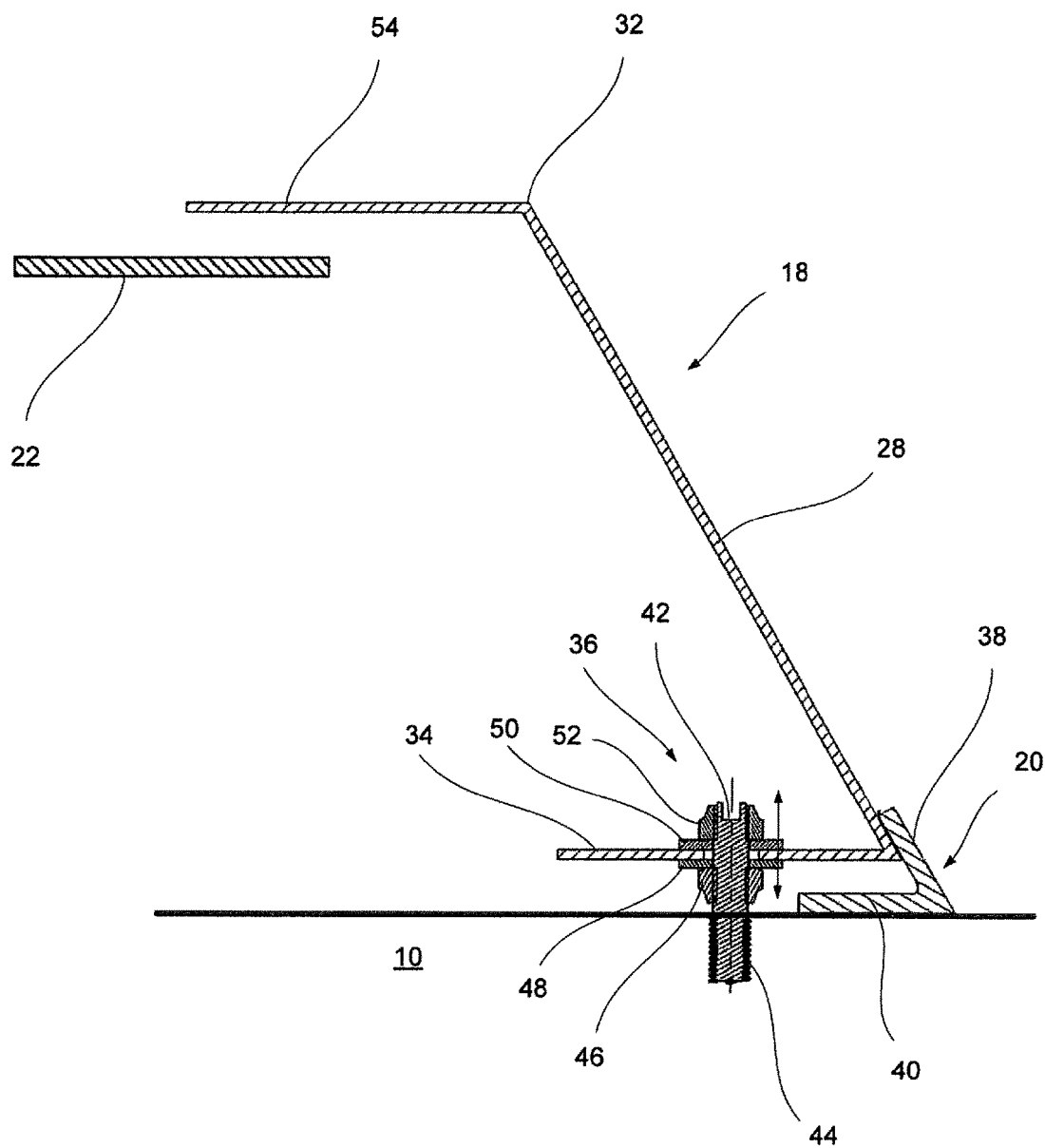
FIG. 3 shows the cover profile and the cover element of FIG. 1 with adjoining rotor blade in a cross-sectional view.

FIG. 3 shows the cover profile 18 with the cover element 20 in a once more enlarged cross-sectional view. It is apparent that the cover element 20 has a conical section 38 and an axially oriented section 40 which adjoins its inner edge. The axially oriented section 40 butts against the surface of the wind turbine rotor blade 10 and is therefore not of a completely circular-cylindrical design. On account of the altogether relatively small radial expansion of the cover element 20 and a corresponding material selection (for example, rubber), the cover element 20 can be readily correspondingly deformed when being fastened on the wind turbine rotor blade 10.

The fastening element 36 has a threaded pin 42 which is screwed into a threaded bushing 44 in the wind turbine rotor blade. A spacer in the form of a first nut 46 is screwed onto the threaded pin 42 and adjusted relative to the surface of the wind turbine rotor blade 10 so that together with a first washer 48 it forms a stop for the retaining section 34 of the cover profile 18. Located above the retaining section 34 is a second washer 50 which is pressed against the retaining section 34 via a second nut 52 which is also screwed onto the threaded pin 42. As a result, the retaining section 34, and therefore the cover profile 18, are reliably fastened on the wind turbine rotor blade 10 at the desired radial distance.

If the longitudinal section of the rotor blade 10—to which is fastened the cover profile 18—has a circular cross section, a sleeve instead of the nut 46 can also be used as a stop for the retaining section 34. The height of the sleeve is then the same for all threaded pins.

It is apparent that the conical section 38 of the cover element 20 butts flat against the conical section 28 of the cover profile 18. Adjoining the outer edge 32 of the conical section 28 is a circular-cylindrical section 54 which is axially oriented and encompasses the circular-cylindrical section 22—only schematically indicated—of the spinner 14. For sealing the gap between the circular-cylindrical section 54 of the cover profile and the spinner, brushes (not shown) can be attached on the spinner.

Figure 4:
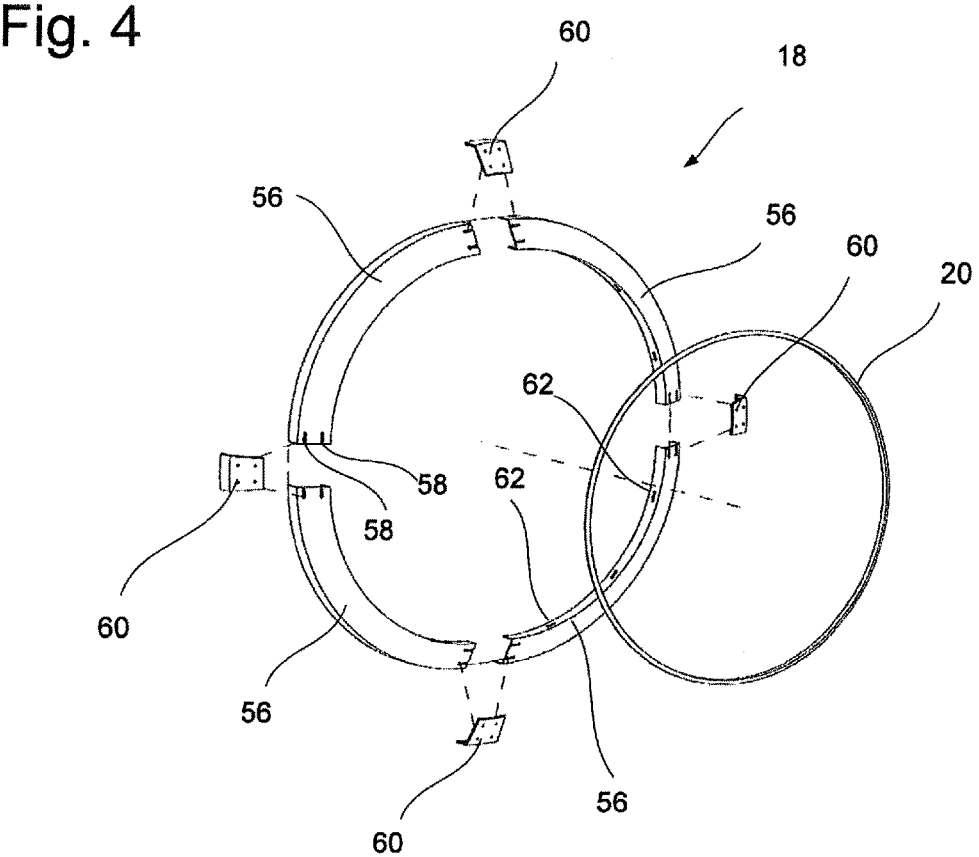
FIG. 4 shows cover profile and cover element of FIG. 1 in a perspective exploded view.

FIG. 4 shows the cover profile 18 with cover element 20 in an exploded view. It is apparent that the cover profile 18 is assembled from four circle segments 56 which each have two elongated holes 58 at their ends. As a result, the circumference of the cover profile 18 can be adapted to requirements. The circle segments 56 are interconnected in each case via a bracket 60, wherein screws are guided through the elongated holes 58 and screwed into the brackets 60. The brackets 60 are preferably provided on the rear side with foam rubber which is compressed during installation in such a manner that the brackets 60 are sealed on the circle segments 56. Also clearly to be seen in FIG. 4 are further circumferentially oriented elongated holes 62 which serve for accommodating the fastening elements 36. As a result of the division into circle segments, the transporting dimensions of the cover profile can be reduced.

Figure 5:
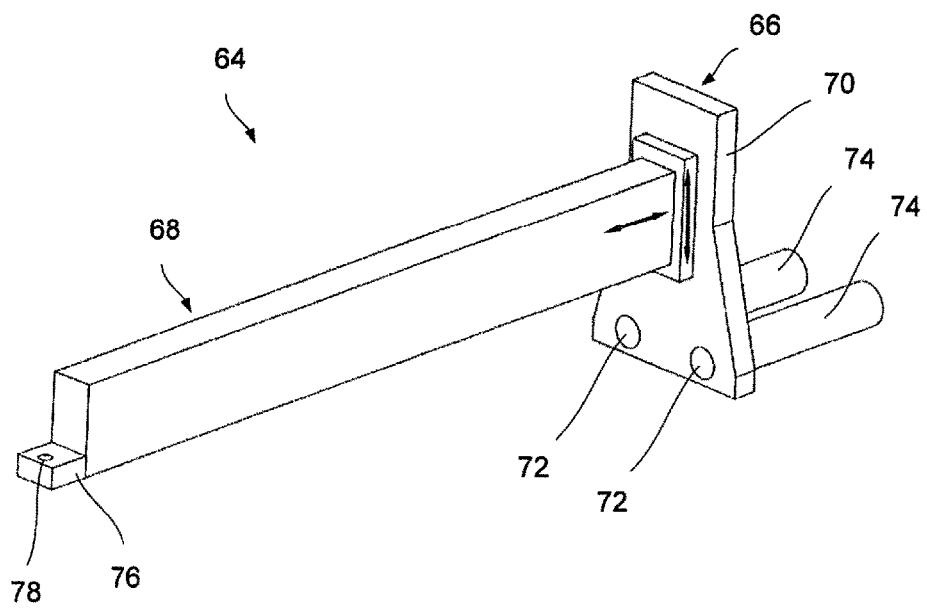
FIG. 5 shows a positioning tool in a perspective view.

FIG. 5 shows a positioning tool 64 which can be used for installing the cover profile 18 on a wind turbine rotor blade 10. The positioning tool 64 has a holding device 66 and a positioning device 68. As indicated by the arrows, the relative arrangement of the positioning device 68 to the holding device 66 in the radial direction and in the axial direction is adjustable with the aid of a guide.

The holding device 66 has a plate-like section 70 with two through-holes 72 which are arranged in the axial direction. Adjoining the through-holes 72 are two retaining tubes 74 so that the fastening bolts 86 (see FIGS. 6D and 6E), which project from the fastening section 88 of the wind turbine rotor blade 10, can be guided through the through-holes 72 and through the retaining tubes 74. An adapter 76 with a socket 78 for a fastening element 36 is arranged at the free end of the positioning device 68.

The use of the positioning tool 64 during the production of a wind turbine rotor blade 10 is described with reference to FIGS. 6A to 6E. FIG. 6A shows a fastening element 80 with a threaded pin 82 and a baseplate 84. Unlike the threaded pin 42 of the fastening element 36 from FIG. 3, the threaded pin 82 is not screwed into an opening in the wind turbine rotor blade 10, but is fixedly connected to the baseplate 84 which is adhesively fastened onto the surface of the wind turbine rotor blade 10.

As shown in FIG. 6B, the fastening element 80 is inserted into the matching socket 78 of the adapter 76 for accommodating the threaded pin 82 for this purpose.

In the method step of FIG. 6C, the positioning tool 64 is first of all suitably adjusted by adjusting the axial and radial positions of the positioning device 68 relative to the holding device 66 for the wind turbine rotor blade 10 which is to be produced.

Corresponding to FIG. 6D, the positioning tool 64 is then lowered onto two fastening bolts 86 which project from the fastening section 88 of the wind turbine rotor blade 10 in the axial direction. In this case, the fastening bolts 86 are guided through the through-holes 72 and the retaining tubes 74 of the holding device 66 and the plate-like section 70 is pushed right onto the fastening section 88. The positioning tool 64 is then located in a predetermined position relative to the wind turbine rotor blade 10.

Next, as shown in FIG. 6E, the adapter 76 is attached with the fastening element 80 on the positioning tool 64 on the free end of the positioning device 68. After this, adhesive is introduced into the gap between the surface of the rotor blade and the underside of the baseplate 84. This serves as a spacer in this exemplary embodiment and bridges the different gap dimensions. After the hardening of the adhesive, the fastening element 80 is accurately fastened on the wind turbine rotor blade 10 at the intended position.

Alternatively, the fastening elements 80 can also be fastened on the rotor blade uniformly with a thin adhesive coating. The positioning on the rotor blade is carried out with the aid of the positioning device. A nut 46 which serves as a spacer, as shown in FIG. 3, is already screwed onto the threaded pin 82 before applying the adhesive and is retained in the adapter 76. The position of the nut 46 on the threaded pin 82 is also adjusted with the aid of the positioning tool 64 after the hardening of the adhesive.

It is understood that the steps of FIGS. 6D and 6E can be repeated at different positions in the circumferential direction of the wind turbine rotor blade. To this end, the wind turbine rotor blade 10 is preferably supported on a rotatable frame.

As already described, the fastening elements 36, 80 are always located at the correct position with regard to the fastening section 88 of the wind turbine rotor blade, which position, in the case of a non-circular-cylindrical longitudinal section 24 of the wind turbine rotor blade 10, can be located at a different radial distance from its surface.

It is understood that the foregoing description is that of the preferred embodiments of the invention and that various changes and modifications may be made thereto without departing from the spirit and scope of the invention as defined in the appended claims.

LIST OF THE APPLIED REFERENCE NUMERALS

10 Wind turbine rotor blade
12 Rotor hub
14 Spinner
16 Rotor blade opening
18 Cover profile
20 Cover element
22 Circular-cylindrical section
24 Longitudinal section
26 Annular gap
28 Conical section
30 Inner edge
32 Outer edge
34 Retaining section
36 Fastening element
38 Conical section
40 Axially oriented section
42 Threaded pin
444 Threaded bushing
46 First nut
48 First washer
50 Second washer
52 Second nut
54 Circular-cylindrical section
56 Circle segment
58 Elongated hole
60 Bracket
62 Further elongated hole
64 Positioning tool
66 Holding device
68 Positioning device
70 Plate-like section
72 Through-hole
74 Retaining tube
76 Adapter
78 Socket
80 Fastening element
82 Threaded pin
84 Baseplate
86 Fastening bolt
88 Fastening section

What is claimed is:

1. A wind turbine rotor blade for mounting on a rotor hub which is covered by a spinner having a rotor blade opening, the wind turbine rotor blade comprising:
a wind turbine rotor blade body having a fastening section and a longitudinal section;
said fastening section being configured for fastening said rotor blade body on the rotor hub;
said longitudinal section being configured to be arranged inside said rotor blade opening when said wind turbine rotor blade is mounted on said rotor hub;
said longitudinal section and the rotor blade opening conjointly defining an annular gap therebetween when said wind turbine rotor blade is mounted on said rotor hub;
a cover profile fastened on said wind turbine rotor blade and configured to cover said annular gap;
said cover profile having a circular ring-shaped outer edge and a circular ring-shaped inner edge;
said circular ring-shaped inner edge being disposed at a radial distance from said wind turbine rotor blade; and,
an annular-shaped cover element fastened on said wind turbine rotor blade and configured to bridge said radial distance.

2. The wind turbine rotor blade of claim 1, wherein:
said circular ring-shaped inner edge defines a circumferential direction; and,
said radial distance varies in said circumferential direction.

3. The wind turbine rotor blade of claim 1, wherein said cover profile further has a retaining section extending from said inner edge in the direction of said fastening section.

4. The wind turbine rotor blade of claim 1 further comprising:
a multiplicity of adjustable fastening elements adaptable to said radial distance between said cover profile and said rotor blade body; and,
said cover profile being fastened on said wind turbine rotor blade body via said multiplicity of adjustable fastening elements.

5. The wind turbine rotor blade of claim 4, wherein said fastening elements each have a threaded pin and an adjustable stop.

6. The wind turbine of claim 1, wherein said cover element butts against said cover profile.

7. A method for making a wind turbine rotor blade comprising the steps of:
providing a wind turbine rotor blade configured to be mounted on a rotor hub which is covered by a spinner having a rotor blade opening, the wind turbine rotor blade having a fastening section for fastening the wind turbine rotor blade on the rotor hub and a longitudinal section which is to be arranged inside the rotor blade opening;
providing a cover profile configured to cover an annular gap between the longitudinal section and the rotor blade opening, the cover profile having a circular-shaped outer edge and a circular-shaped inner edge;
arranging and fastening the cover profile on the wind turbine rotor blade in such a manner that the inner edge of the cover profile is at a radial distance from the wind turbine rotor blade; and,
arranging and fastening a cover element on the wind turbine rotor blade in such a manner that the cover element bridges the radial distance.

8. The method of claim 7 further comprising the steps of:
attaching a multiplicity of fastening elements having adjustable spacers on the wind turbine rotor blade; and,
adapting the spacers to the radial distance between the cover profile and the wind turbine rotor blade.

9. The method of claim 8, wherein a positioning tool is at least one of aligned on the fastening section and fastened on the fastening section.

10. The method of claim 9 further comprising the step of positioning the fastening elements on the wind turbine rotor blade via the positioning tool.

11. The method of claim 9, wherein at least one of the spacers is adapted to the radial distance between the cover profile and the wind turbine rotor blade via the positioning tool.

12. The method of claim 9, wherein the positioning tool has a socket, the method further comprising the step of inserting the fastening element into the socket of the positioning tool after the positioning tool is oriented or fastened to the fastening section.

13. The method of claim 7, wherein the cover element is fastened to the wind turbine rotor blade before the wind turbine rotor blade is transported to an erection site; and, the cover profile is fastened to the wind turbine rotor blade after the wind turbine rotor blade has been transported to the erection site.

* * * * *